Patented Dec. 17, 1935

2,024,534

UNITED STATES PATENT OFFICE 2,024,534

MONOALKYL ETHER OF AROMATIC POLYHYDROXY COMPOUNDS

Karl Marx, Hans Wesche, and Karl Bittner, Dessau in Anhalt, and Hans Saenger, Bitterfeld, Germany, assignors to General Aniline Works, Inc., New York, N. Y., a corporation of Delaware No Drawing. Application July 20, 1933, Serial No. 681,396. In Germany October 8, 1932

3 Claims. (Cl. 260—150)

Our present invention relates to an improvement in the manufacture of monoalkyl ethers of aromatic polyhydroxy compounds and provides a new process for manufacturing these products in a very pure state and with a good yield.

A further object of our invention is to provide a process of the kind mentioned above, in which the etherification of the hydroxy compounds in question may be directly combined with a process of preparing the said parent materials.

In U. S. Patent No. 1,966,635, patented July 17, 1934, of which Karl Marx is a co-inventor, there is disclosed a process of manufacturing monoalkyl ethers of aromatic polyhydroxy compounds by acting with an alkyl halide upon a dry monoalkali metal compound of an aromatic polyhydroxy compound suspended in an organic liquid which is inert to the reacting components.

Now, we have found that the manufacture of the monoethers in question may be further improved when starting from the anhydrous acid alkaline-earth metal salts of polyhydroxy aromatic compounds. Thus, we act with an alkyl halide upon such an acid salt suspended in an organic liquid which is inert to the reacting components. As a medium in which the double decomposition may be performed, we mention, for instance, chlorobenzene, xylene, toluene, benzene, aliphatic hydrocarbons, such as petroleum distillates boiling between 150 to 300° C. or hydrated aromatic hydrocarbons, such as hexahydrobenzene, tetrahydronaphthalene and similar compounds. These organic liquids preferably are used in a completely anhydrous state. Inasmuch as the reacting mixture may be heated to a temperature higher than the boiling point of the alkyl halides and the organic suspending liquid, the reaction is carried out in a pressure vessel.

With the use of the acid alkaline-earth metal salts of polyhydroxy aromatic compounds, it becomes possible to start from halo phenols and to work up directly the reaction products as obtained by decomposition of halo phenols with alkaline-earth metal hydroxides. This method of preparing aromatic polyhydroxy compounds from the corresponding halo compound with the aid of, for instance, calcium hydroxide, is preferred inasmuch as a great number of the polyhydroxy compounds in question are sensitive against the action of caustic alkalies. Thus, the monoalkyl ethers of aromatic polyhydroxy compounds may be made from the corresponding halogenated phenols without separation of the polyhydroxy compounds formed as intermediate products. In this case, the procedure is as follows:

The halo phenol or the corresponding alkali metal salt is treated with an alkaline-earth, preferably with Ba(OH)$_2$, and with addition of a catalyst as, for instance, copper or copper salts, in a closed vessel at a raised temperature, for instance, 150 to 250° C. Then the reaction product is converted in the known manner by addition of an acid into the acid alkaline-earth metal salt, which in the case of catechol corresponds to the formula

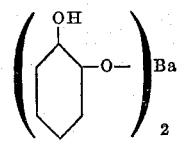

Then the reaction mixture is freed from water, preferably by azeotropic distillation under addition of a suitable solvent, such as xylene, cholobenzene, carbon tetrachloride and so on. To the dry suspension of the acid salt in an organic solvent of the class mentioned above, the required quantity of an alkyl chloride is added and the reaction is effected for forming the desired monoalkyl ether by heating the mixture to a higher temperature preferably between 180 to 250° C.

The following examples serve to illustrate the invention, the parts being by weight:—

*Example 1.*—A solution of 110 parts of 1,2-dihydroxybenzene in 200 parts of water is stirred at 60° C. with a solution of 318 parts of barium hydroxide dissolved in 600 parts of water. Then a further solution of 110 parts of 1,2-dihydroxybenzene in 200 parts of water is added while stirring is continued for a short time. After addition of xylene, the water is separated by azeotropic distillation, the xylene are allowed to run back from the condenser into the reacting mixture. When the acid barium salt of 1,2-dihydroxybenzene is completely freed from water, and is still suspended in the xylene added, 126 parts of chloromethane are introduced and the whole is heated to 240° C. for 4 hours. After cooling, the product is worked up in the usual manner. It may be converted, for instance, into the sodium salt of the monoether by addition of caustic soda. Then the solvent is blown off by means of steam. After acidification, the 1-methoxy-2-hydroxybenzene is distilled with steam. The guaiacol dissolved in water is extracted and distilled together with the main quantity. The yield of pure guaiacol amounts to 173 parts and only traces of veratrol can be detected.

*Example 2.*—385 parts of 1-hydroxy-2-chlorobenzene are heated for 12 hours at 200° C. together with 132 parts of caustic soda, 1023 parts of barium hydroxide and 30 parts of cuprous chloride under addition of water. After addition of 144 parts of phosphoric acid, the mixture is freed from water by azeotropic distillation with the aid of xylene. To the suspension of the monosalt in xylene, completely freed from water, 170 parts of chloromethane are added and the whole is heated to about 240° C. for 4 hours. After working up the reaction mixture, 243 parts of guaiacol are obtained and only traces of veratrol are formed.

In a manner completely analogous to that described in the foregoing examples, 1,3-dihydroxybenzene and 1,4-dihydroxybenzene may be converted into the corresponding monoalkyl ethers either by starting from the dihydroxy compounds or the corresponding chlorophenols. Instead of chloromethane the corresponding quantity of chloroethane or higher alkyl chlorides, such as chloropropane and so on, may be used. Instead of caustic baryta, caustic lime may be employed for the formation of the monosalt.

It is obvious that polyhydroxy compounds of the naphthalene series may be likewise monoetherified in the manner illustrated by the examples. Thus, for instance, monoethers of 2,7-, 1,5-, 2,6-, or 1,8-dihydroxynaphthalene are obtainable.

What we claim is:—

1. The process of manufacturing monoalkyl ethers of aromatic polyhydroxy compounds which comprises acting with an alkyl halide upon an anhydrous acid alkaline-earth metal salt of an aromatic polyhydroxy compound suspended in an organic liquid which is inert to the reacting components.

2. The process of manufacturing a monoalkyl ether of 1,2-dihydroxybenzene, which comprises acting with an alkyl halide upon an anhydrous acid alkaline-earth metal salt of 1,2-dihydroxybenzene suspended in an inert organic liquid.

3. The process which comprises heating in an aqueous solution ortho-chlorophenol with one molecular proportion of caustic alkali and one molecular proportion of barium hydroxide, adding an acid sufficient to form the salt of the formula

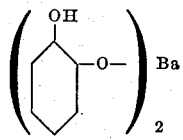

freeing the mixture from water, suspending the dry reaction mixture in xylene, adding one molecular proportion of chloromethane and heating to about 240° C.

KARL MARX.
HANS WESCHE.
KARL BITTNER.
HANS SAENGER.